United States Patent
Tsengas

(12) 
(10) Patent No.: US 6,371,053 B1
(45) Date of Patent: Apr. 16, 2002

(54) SIMULATED MOUSE TOY HAVING A PRERECORDED SOUND CHIP THEREIN

(76) Inventor: Steven Tsengas, 7768 Litchfield Dr., Mentor, OH (US) 44060

(*) Notice: Subject to any disclaimer, the term of this patent is extended or adjusted under 35 U.S.C. 154(b) by 0 days.

(21) Appl. No.: 09/479,001

(22) Filed: Jan. 7, 2000

Related U.S. Application Data

(60) Provisional application No. 60/115,176, filed on Jan. 8, 1999.

(51) Int. Cl.$^7$ .............................. A01K 29/00; A63H 5/00
(52) U.S. Cl. ..................... 119/707; 446/397; 446/297
(58) Field of Search ..................... 119/707, 709, 119/710, 711; 229/87.02; 446/297, 369, 397

(56) References Cited

U.S. PATENT DOCUMENTS

| | | | |
|---|---|---|---|
| 1,265,926 A | * 5/1918 | Ludlam | ................. 119/710 X |
| 3,904,210 A | 9/1975 | Licitis | |
| 3,935,669 A | 2/1976 | Potrzuski et al. | |
| 4,249,338 A | 2/1981 | Wexler | |
| 4,318,245 A | 3/1982 | Stowell et al. | |
| 4,391,224 A | 7/1983 | Adler | |
| 4,551,114 A | 11/1985 | Hyman et al. | |
| 4,602,360 A | 7/1986 | Porcelli | |
| 4,662,260 A | 5/1987 | Rumsey | |
| 4,712,510 A | 12/1987 | Tae-Ho | |
| 5,046,986 A | * 9/1991 | Wood et al. | ................. 446/321 |
| 5,119,001 A | 6/1992 | Moore et al. | |
| 5,370,223 A | * 12/1994 | Leicht, Jr. | ............... 229/162 X |
| 5,390,629 A | 2/1995 | Simone | |
| 5,517,948 A | 5/1996 | Udelle et al. | |
| 5,533,920 A | 7/1996 | Arad et al. | |
| 5,542,376 A | 8/1996 | Udelle et al. | |
| 5,575,240 A | 11/1996 | Udelle et al. | |
| 5,609,508 A | 3/1997 | Wingate | |
| 5,634,436 A | 6/1997 | Coombs et al. | |
| 5,657,721 A | 8/1997 | Mayfield et al. | |
| 5,673,651 A | 10/1997 | Udelle et al. | |
| 5,679,049 A | 10/1997 | Arad et al. | |
| 5,743,215 A | 4/1998 | Zeff | |
| 5,785,005 A | 7/1998 | Udelle et al. | |
| 5,794,568 A | 8/1998 | Udelle et al. | |
| 5,875,736 A | 3/1999 | Udelle et al. | |
| 5,876,263 A | 3/1999 | DeCasare et al. | |
| 5,934,223 A | 8/1999 | Ellery-Guy | |
| 5,975,982 A | * 11/1999 | Spector | ...................... 446/397 |
| 6,000,987 A | 12/1999 | Belin et al. | |
| 6,039,628 A | 3/2000 | Kusmiss et al. | |
| 6,058,887 A | 5/2000 | Silverman | |
| 6,196,893 B1 | 3/2001 | Casola et al. | |

OTHER PUBLICATIONS

Silly Slammers. Datasheet (online). Gibson Greetings, Inc. Corporation. Retrieved from the Internet: <URL: http://members.aol.com/ToyExchange/SillySlammers/SillySlammers.htm>. On sale at least as early as Oct. 15, 1997).

\* cited by examiner

*Primary Examiner*—Robert P. Swiatek

(57) ABSTRACT

A simulated mouse toy for pets having a prerecorded sound chip therein which includes a pet toy, most preferably fabricated from a cloth material with filling or stuffing, or alternatively, a plastic material, having the configuration of a mouse and a shaker barrel activator, a prerecorded sound chip and catnip in the interior of the pet toy having a configuration of a mouse. The catnip and the appearance of the pet toy having a configuration of a mouse will attract pets, such as, for example, cats, and when the pet swats the simulated mouse toy for pets having a prerecorded sound chip therein, a prerecorded sound will be activated.

19 Claims, 5 Drawing Sheets

SIMULATED MOUSE TOY HAVING A PRERECORDED SOUND CHIP THEREIN

This application claims the benefit of U.S. Provisional application Ser. No. 60/115,176, filed Jan. 8, 1999.

BACKGROUND AND SUMMARY OF THE INVENTION

The present invention relates generally to new and novel improvements in a simulated mouse toy having a prerecorded sound chip therein. More particularly, the present invention relates to a simulated mouse toy having a prerecorded sound chip therein which is durable and lightweight and provides pets and/or children with exercise and enjoyment.

Pets, such as, for example, cats, which spend the majority of their time indoors are becoming increasingly popular. In addition, due to the increasingly busy schedules of their owners, such pets are spending an increasing amount of time alone indoors when their owners are not present. While having healthy and happy pets is an objective of virtually every pet owner, the ability of pet owners to exercise and play with their pets is sometimes limited due to a lack of time and energy on behalf of the pet owner.

Many different devices have been developed to assist pet owners in keeping their pets happy and healthy. Such devices can be seen in numerous pet stores and catalogs. Different types of balls, bones and other such toys can be purchased by the owner to be used by their pets for exercise and enjoyment. However, pets tend to quickly lose interest in such devices and thus, the pets do not benefit from exercise and enjoyment from such devices when they are not used by the pets. In contrast, the simulated mouse toy having a prerecorded sound chip therein in accordance with the present invention emits a prerecorded sound when swatted to encourage pets to continue to play with the simulated mouse toy having a prerecorded sound chip therein and thus receive benefit from exercise and enjoyment from playing with the simulated mouse toy having a prerecorded sound chip therein for longer and more frequent periods of time.

In addition, children are always seeking toys and games for entertainment and enjoyment. The simulated mouse toy having a prerecorded sound chip therein in accordance with the present invention emits a prerecorded sound when children move or shake the simulated mouse toy having a prerecorded sound chip therein thereby entertaining and providing enjoyment for children.

Accordingly, an object of the present invention is the provision of a simulated mouse toy having a prerecorded sound chip therein which is durable and lightweight.

Another object of the present invention is to provide a simulated mouse toy having a prerecorded sound chip therein emits a prerecorded sound when swatted, moved and/or shaken to encourage pets and/or children to play with the simulated mouse toy having a prerecorded sound chip therein for longer and more frequent periods of time.

These and other objects of the present invention are attained by a simulated mouse toy having a prerecorded sound chip therein which includes a pet toy, most preferably fabricated from a cloth material with filling or stuffing, or alternatively, a plastic material, having the configuration of a mouse and a shaker barrel activator and a prerecorded sound chip. If desired, catnip and/or other fragrances or scents can be placed into the interior of the simulated mouse toy having a prerecorded sound chip therein. The appearance of the simulated mouse having a prerecorded sound chip therein will attract pets and/or children. In addition, catnip and/or other fragrances or scents in the interior of the simulated mouse toy having a prerecorded sound chip therein would be particularly attractive to, for example, cats. Thus, when a pet swats and/or a child moves or shakes the simulated mouse toy having a prerecorded sound chip therein, a prerecorded sound is be activated.

DETAILED DESCRIPTION OF THE DRAWINGS

Figure 1:
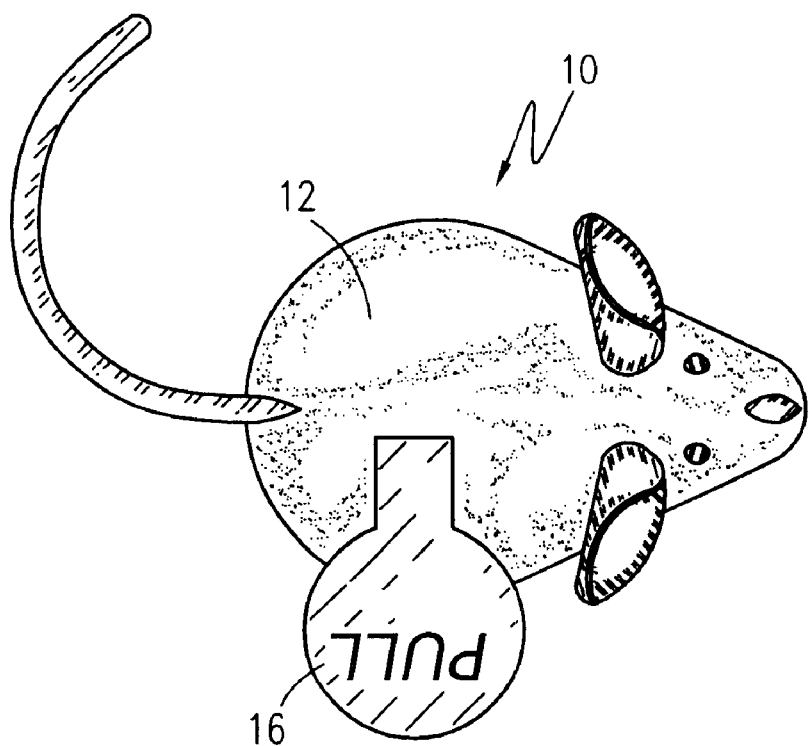
FIG. 1 is top view of a simulated mouse toy having a prerecorded sound chip therein in accordance with a first preferred embodiment of the present invention.
Figure 2:
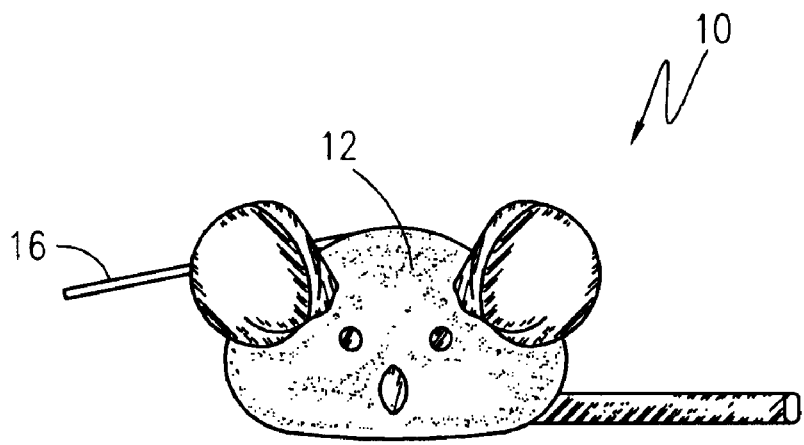
FIG. 2 is a front view of the simulated mouse toy having a prerecorded sound chip therein in accordance with the first preferred embodiment of the present invention shown in FIG. 1.
Figure 3:
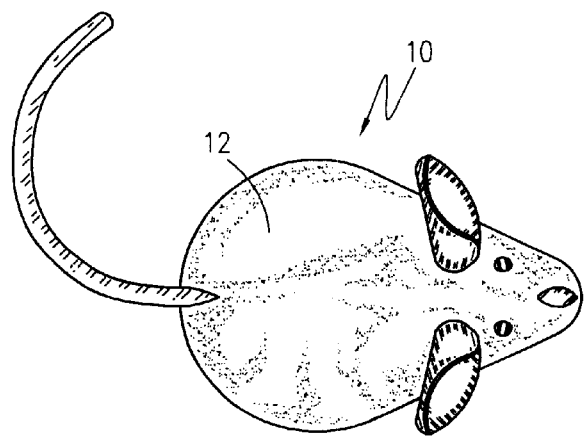
FIG. 3 is an exploded top view of the simulated mouse toy having a prerecorded sound chip therein in accordance with the first preferred embodiment of the present invention shown in FIG. 1 with the sound chip assembly removed from the simulated mouse toy.
Figure 3:
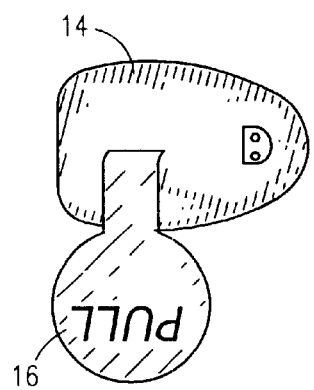

In the following detailed description of preferred embodiments of the present invention, reference is made to the accompanying drawings which, in conjunction with this detailed description, illustrate and describe a first preferred embodiment, a second preferred embodiment, a third preferred embodiment, a fourth preferred embodiment and a fifth preferred embodiment of a simulated mouse toy for pets having a prerecorded sound chip therein in accordance with the present invention. Referring now to the drawings, in which like-referenced characters indicate corresponding elements throughout the several views, attention is first directed to FIGS. 1 through 3 which illustrate a top view, a front view, and an exploded top view, respectively, of a simulated mouse toy having a prerecorded sound chip therein in accordance with the a first preferred embodiment of the present invention, identified generally by reference number 10. Simulated mouse toy having a prerecorded sound chip therein generally includes outer cover 12 having an internal cavity and sound chip assembly 14 is positioned in the interior cavity of outer cover 12. Outer cover 12 is most preferably fabricated from a relatively soft, yet durable, textile material with filling or stuffing and has the outward appearance of a mouse. Sound chip assembly 14 includes a shaker barrel activator, a prerecorded sound chip and a source of electrical power, such as a battery. If desired, catnip can be placed in the interior cavity of outer cover 12 and the catnip, along with the outward appearance of outer cover 12, will attract pets, such as, for example, cats.

Sound chip assembly 14 preferably emits a prerecorded sound in response to movement of sound chip assembly 14. Thus, when a pet, such as a cat, swats simulated mouse toy for pets having a prerecorded sound chip therein 10, a prerecorded sound is activated. This prerecorded sound can be a "permanent" prerecorded sound such as an animal's voice, such as "meow" or "purrrrrr," a beeping sound, a human voice, laughter, such as "ha, ha, ha" or some other desired sound, or can be recorded, and rerecorded, as desired, by the user. The prerecorded sound continues for a predetermined time period, for example five (5) seconds, and then stops until simulated mouse toy having a prerecorded sound chip therein 10 is again moved. Pull tab 16 is preferably inserted into sound chip assembly 14 to preclude sound chip assembly 14 from emitting sound prior to pull tab 16 being removed from sound chip assembly 14.

Figure 4:
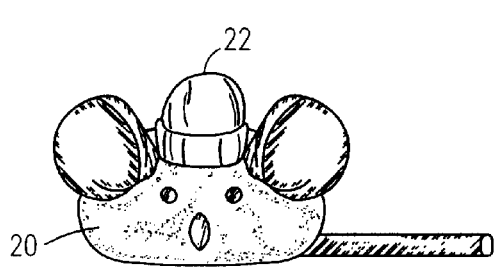
FIG. 4 is a front view of the simulated mouse toy having a prerecorded sound chip therein in accordance with the second preferred embodiment of the present invention.

Referring now to FIG. 4, which illustrates a top view of a simulated mouse toy having a prerecorded sound chip therein in accordance with the a second preferred embodiment of the present invention, identified generally by reference number 20. Simulated mouse toy having a prerecorded sound chip therein 20 is similar to simulated mouse toy having a prerecorded sound chip therein 10, except simulated mouse toy having a prerecorded sound chip therein 20 includes stocking hat 22.

Figure 5:
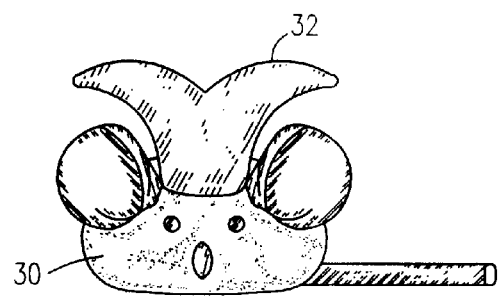
FIG. 5 is a front view of the simulated mouse toy having a prerecorded sound chip therein in accordance with the third preferred embodiment of the present invention.

Referring next to FIG. 5, which illustrates a top view of a simulated mouse toy having a prerecorded sound chip therein in accordance with the a third preferred embodiment of the present invention, identified generally by reference number 30. Simulated mouse toy having a prerecorded sound chip therein 30 is similar to simulated mouse toy having a prerecorded sound chip therein 10, except simulated mouse toy having a prerecorded sound chip therein 30 includes jester's hat 32 similar in appearance to head coverings worn by jesters in medieval times.

Figure 6:
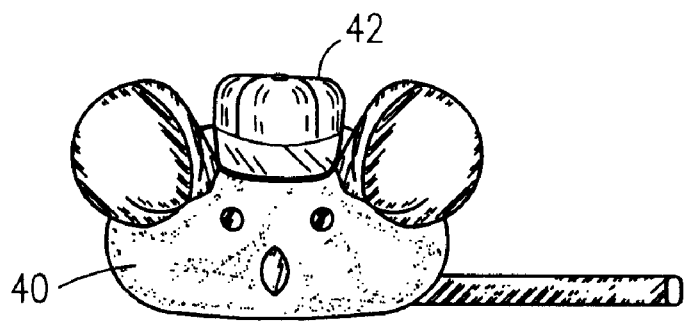
FIG. 6 is a front view of the simulated mouse toy having a prerecorded sound chip therein in accordance with the fourth preferred embodiment of the present invention.

Referring now to FIG. 6, which illustrates a top view of a simulated mouse toy having a prerecorded sound chip therein in accordance with the a fourth preferred embodiment of the present invention, identified generally by reference number 40. Simulated mouse toy having a prerecorded sound chip therein 40 is similar to simulated mouse toy having a prerecorded sound chip therein 10, except simulated mouse toy having a prerecorded sound chip therein 40 includes baseball hat 42.

Figure 7:
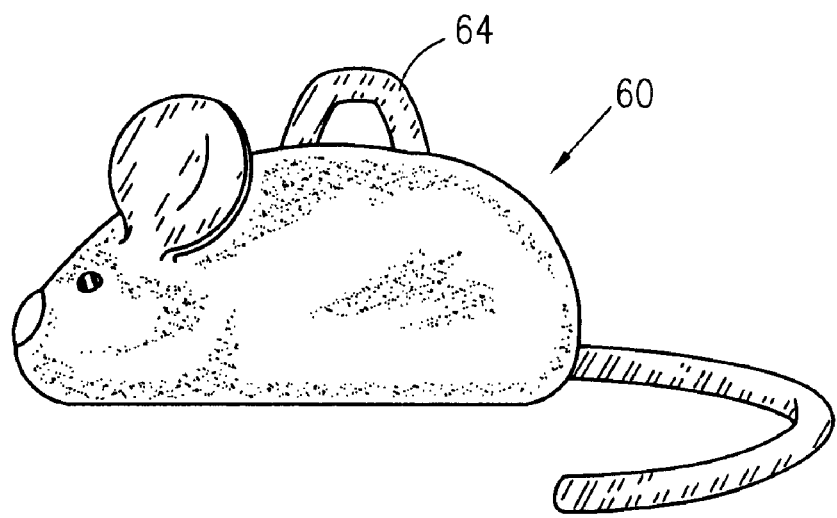
FIG. 7 is a side view of a simulated mouse toy having a prerecorded sound chip therein in accordance with a fifth preferred embodiment of the present invention.
Figure 8:
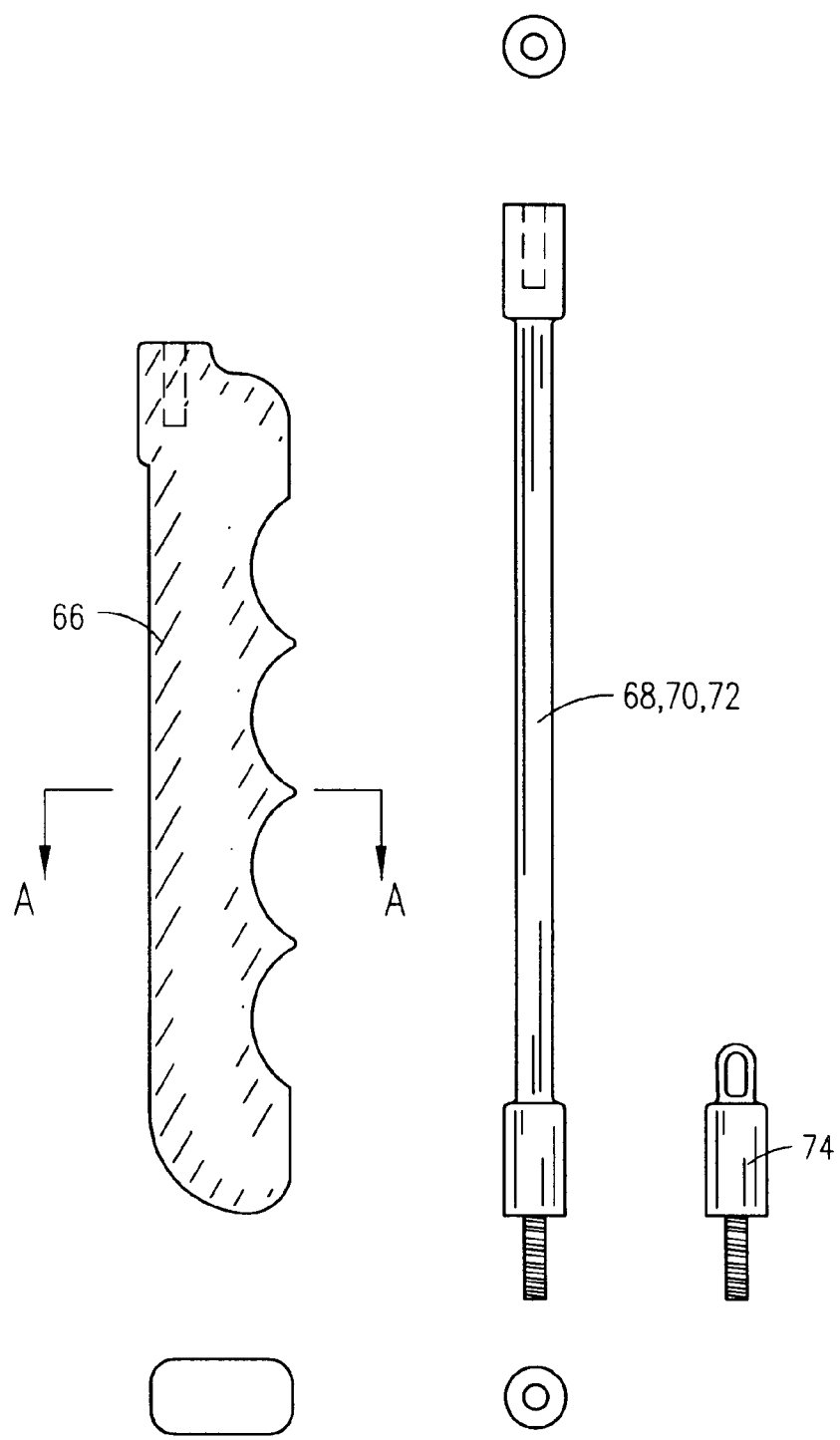
FIG. 8 is an exploded top view of a handle assembly capable of being used with the simulated mouse toy having a prerecorded sound chip therein in accordance with the fifth preferred embodiment of the present invention shown in FIG. 7.
Figure 9:
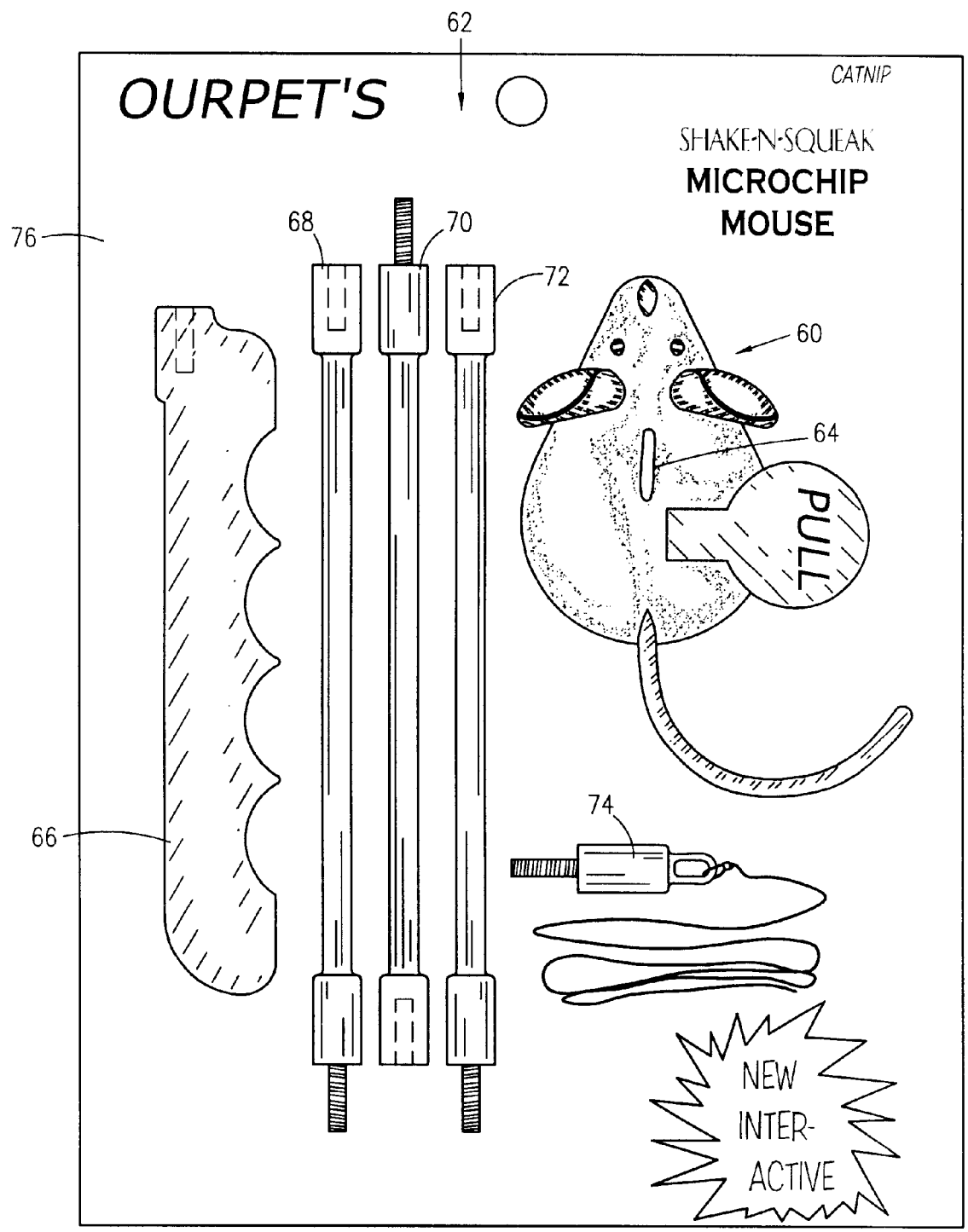
FIG. 9 is a top view of the simulated mouse toy having a prerecorded sound chip therein in accordance with the fifth preferred embodiment of the present invention shown in FIG. 7 and the handle assembly capable of being used with the simulated mouse toy having a prerecorded sound chip therein in accordance with the fifth preferred embodiment of the present invention shown in FIG. 8 packaged for retail sale.

Referring now to FIGS. 7 through 9, which illustrate side views of a simulated mouse toy having a prerecorded sound chip therein in accordance with a fifth preferred embodiment of the present invention, an exploded top view of a handle assembly capable of being used with the simulated mouse toy having a prerecorded sound chip therein in accordance with the fifth preferred embodiment of the present invention shown in FIG. 7 and a top view of the simulated mouse toy having a prerecorded sound chip therein in accordance with the fifth preferred embodiment of the present invention shown in FIG. 7 and the handle assembly capable of being used with the simulated mouse toy having a prerecorded sound chip therein in accordance with the fifth preferred embodiment of the present invention shown in FIG. 8 packaged for retail sale, respectively, handle assembly 62 preferably consists of five (5) separate pieces which are readily assembled together. Simulated mouse toy having a prerecorded sound chip therein 60 preferably includes eyelet 64 for attachment to a string or hook. Handle assembly 62 preferably includes handle portion 66 and three (3) intermediate portions 68, 70 and 72 which are capable of being joined together by threaded connections. String or hook portion 74 is capable of being threadably attached to the end of intermediate portion 72 distal from handle portion 66 and is attached to eyelet 64 on simulated mouse toy having a prerecorded sound chip therein 60. Simulated mouse toy having a prerecorded sound chip therein 60, handle portion 66, intermediate portions 68, 70 and 72 and string or hook portion 74 are preferably packaged for retail sale on underlying card 76 having overlying substantially transparent dome or cover (not shown).

Referring now to FIGS. 28 through 30, which illustrate a side view of a simulated mouse toy having a prerecorded sound chip therein in accordance with a fifth preferred embodiment of the present invention, an exploded top view of a handle assembly capable of being used with the simulated mouse toy having a prerecorded sound chip therein in accordance with the fifth preferred embodiment of the present invention shown in FIG. 28 and a top view of the simulated mouse toy having a prerecorded sound chip therein in accordance with the fifth preferred embodiment of the present invention shown in FIG. 28 and the handle assembly capable of being used with the simulated mouse toy having a prerecorded sound chip therein in accordance with the fifth preferred embodiment of the present invention shown in FIG. 29 packaged for retail sale, respectively, handle assembly 62 preferably consists of five (5) separate pieces which are readily assembled together. Simulated mouse toy having a prerecorded sound chip therein 60 preferably includes eyelet 64 for attachment to a string or hook. Handle assembly 62 preferably includes handle portion 66 and three (3) intermediate portions 68, 70 and 72 which are capable of being joined together by threaded connections. String or hook portion 74 is capable of being threadably attached to the end of intermediate portion 72 distal from handle portion 66 and is attached to eyelet 64 on simulated mouse toy having a prerecorded sound chip therein 60. Simulated mouse toy having a prerecorded sound chip therein 60, handle portion 66, intermediate portions 68, 70 and 72 and string or hook portion 74 are preferably packaged for retail sale on underlying card 76 having overlying substantially transparent dome or cover 78.

Although the present invention has been described above in detail, the same is by way of illustration and example only and is not to be taken as a limitation on the present invention. For example, further features and advantages of the simulated mouse toy for pets having a prerecorded sound chip therein in accordance with a preferred embodiment of the present invention are shown and discussed in the drawings enclosed. In addition, the simulated mouse toy for pets having a prerecorded sound chip in accordance with the present invention could be further modified in various ways. Accordingly, the scope and content of the present invention are to be defined only by the terms of the appended claims.

What is claimed is:

1. A pet toy having a prerecorded sound chip therein, comprising:

an outer cover having a mouse like appearance, said outer cover including an interior cavity; and a sound chip assembly having a sound chip and a source of electrical power, said sound chip assembly is positioned in said interior cavity of said outer cover and said sound chip assembly emits a prerecorded sound in response to one or both of commencement and continuation of movement of said pet toy having a prerecorded sound chip therein.

2. The pet toy having a prerecorded sound chip therein in accordance with claim 1, wherein said outer cover is fabricated from a textile material.

3. The pet toy having a prerecorded sound chip therein in accordance with claim 1, wherein catnip is placed in said interior cavity of said outer cover.

4. The pet toy having a prerecorded sound chip therein in accordance with claim 1, wherein said outer cover includes a stocking hat.

5. The pet toy having a prerecorded sound chip therein in accordance with claim 1, wherein said outer cover includes a jester's hat.

6. The pet toy having a prerecorded sound chip therein in accordance with claim 1, wherein said outer cover includes a baseball hat.

7. The pet toy having a prerecorded sound chip therein in accordance with claim 1, wherein said source of electrical power is a battery.

8. The pet toy having a prerecorded sound chip therein in accordance with claim 1, wherein said sound chip assembly includes a removable pull tab which precludes said sound chip assembly from emitting said precorded sound until said removable pull tab is removed from said sound chip assembly.

9. A pet toy having a prerecorded sound chip therein and handle assembly, comprising:

an outer cover having a mouse like appearance, said outer cover including an interior cavity;

a sound chip assembly having a sound chip and a source of electrical power, said sound chip assembly is positioned in said interior cavity of said outer cover and said sound chip assembly emits a prerecorded sound in response to movement of said pet toy having a prerecorded sound chip therein; and a handle assembly having a handle portion, an elongated intermediate portion and a length of string having a first end and a second end, said first end of said length of string is attached to said elongated intermediate portion distal from said handle portion and said second end of said length of string is attached to said outer cover, the handle portion and elongated intermediate portion being separate and independent from the length of string.

10. The pet toy having a prerecorded sound chip therein and handle assembly in accordance with claim 9, wherein pet toy having a prerecorded sound chip includes an eyelet and said length of string is attached to said eyelet.

11. The pet toy having a prerecorded sound chip therein and handle assembly in accordance with claim 9, wherein said outer cover is fabricated from a textile material.

12. The pet toy having a prerecorded sound chip therein and handle assembly in accordance with claim 9, wherein catnip is placed in said interior cavity of said outer cover.

13. The pet toy having a prerecorded sound chip therein and handle assembly in accordance with claim 9, wherein said source of electrical power is a battery.

14. The pet toy having a prerecorded sound chip therein and handle assembly in accordance with claim 9, wherein said sound chip assembly includes a removable pull tab which precludes said sound chip assembly from emitting sound until said removable pull tab is removed from said sound chip assembly.

15. The pet toy having a prerecorded sound chip therein and handle assembly in accordance with claim 9, wherein said handle assembly is capable of being at least partially disassembled to form a compact configuration.

16. The pet toy having a prerecorded sound ship therein and handle assembly in accordance with claim 9, wherein said second end of said length of string is attached to a top portion of said outer cover.

17. A pet toy having a prerecorded sound chip therein and handle assembly, comprising:

an outer cover having a mouse like appearance, said outer cover including an interior cavity;

a sound chip assembly having a sound chip and a source of electrical power, said sound chip assembly is positioned in said interior cavity of said outer cover and said sound chip assembly emits a prerecorded sound in response to movement of said pet toy having a prerecorded sound chip therein; and a handle assembly having a handle portion, an elongated intermediate portion and a length of string having a first end and a second end, said first end of said length of string is attached to said elongated intermediate portion distal from said handle portion and said second end of said length of string is attached to said outer cover, wherein said handle portion and said elongated intermediate portion of said handle assembly are separate independent components which are joined together using at least one threaded connection.

18. A pet toy having a prerecorded sound chip therein and handle assembly, comprising:

an outer cover having a mouse like appearance, said outer cover including an interior cavity;

a sound chip assembly having a sound chip and a source of electrical power, said sound chip assembly is positioned in said interior cavity of said outer cover and said sound chip assembly emits a prerecorded sound in response to movement of said pet toy having a prerecorded sound chip therein; and a handle assembly having a handle portion, an elongated intermediate portion and a length of string having a first end and a second end, said first end of said length of string is attached to said elongated intermediate portion distal from said handle portion and said second end of said length of string is attached to said outer cover, wherein said handle portion and said elongated intermediate portion of said handle assembly are separate independent components which are joined together using at least one threaded connection and said length of string is attached to string or hook portion which is threadably attached to said elongated intermediate portion distal from said handle portion.

19. A pet toy having a prerecorded sound chip therein and handle assembly, comprising:

an outer cover having a mouse like appearance, said outer cover including an interior cavity;

a sound chip assembly having a sound chip and a source of electrical power, said sound chip assembly is positioned in said interior cavity of said outer cover and said sound chip assembly emits a prerecorded sound in response to movement of said pet toy having a prerecorded sound chip therein; and a handle assembly having a handle portion, an elongated intermediate portion and a length of string having a first end and a second end, said first end of said length of string is attached to said elongated intermediate portion distal from said handle portion and said second end of said length of string is attached to said outer cover, wherein said elongated intermediate portion includes three intermediate portions and said handle portion, said three intermediate portions and a hook or string portion are joined together using threaded connections.

* * * * *